Feb. 3, 1925.
E. H. LICHTENBERG
1,525,100
CONCRETE MIXER THREE-WAY VALVE MECHANISM
Filed May 1, 1922
3 Sheets-Sheet 3
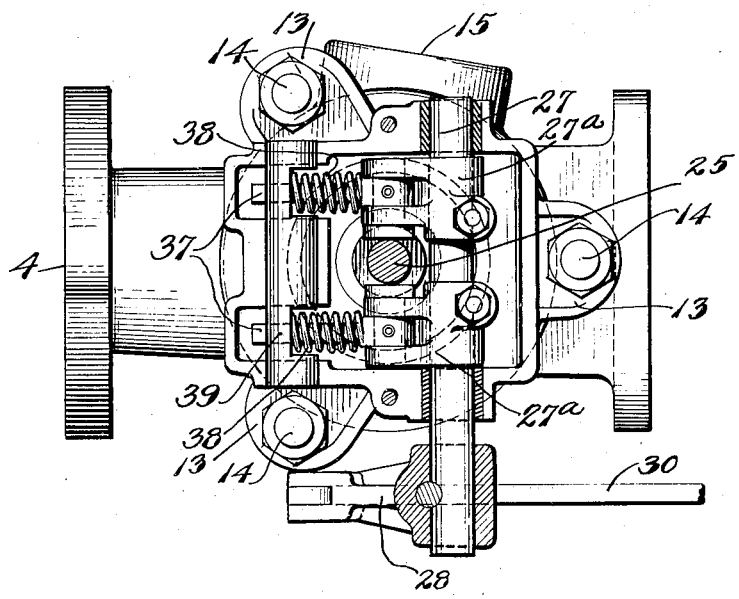
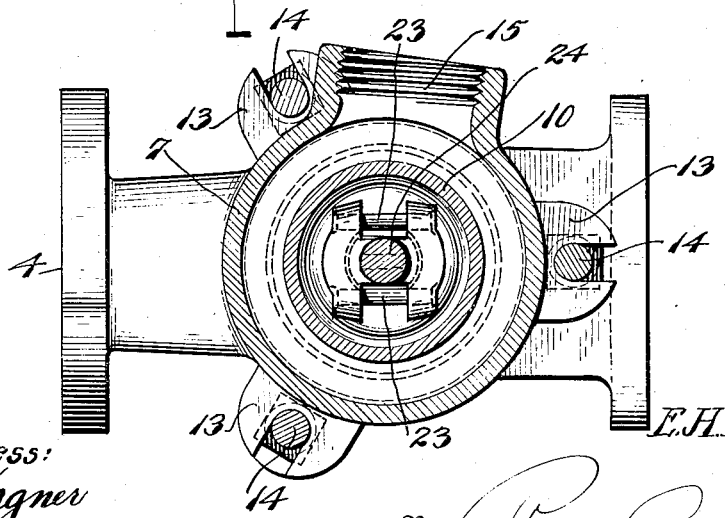
Witness:
G.H. Wagner
Inventor
E.H. Lichtenberg
By Robb, Robb & Hill
Attorneys Patented Feb. 3, 1925.

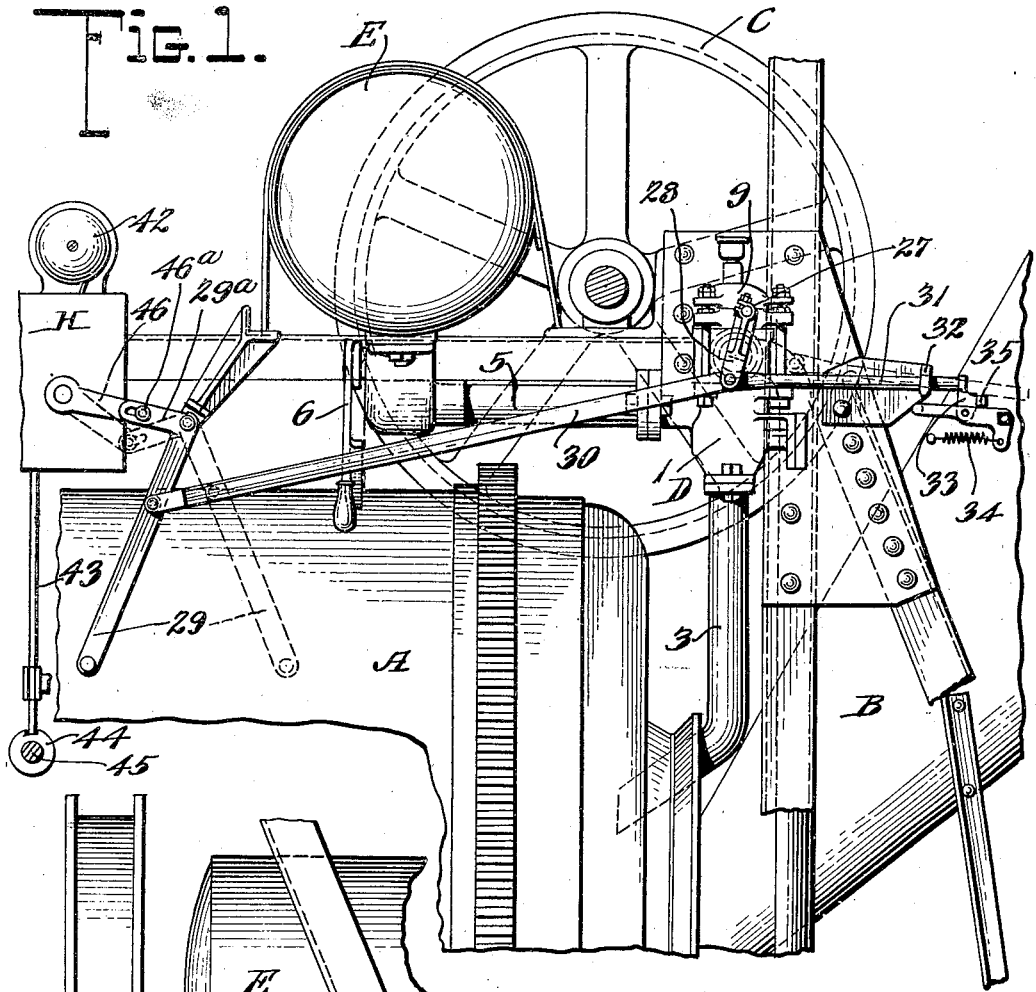

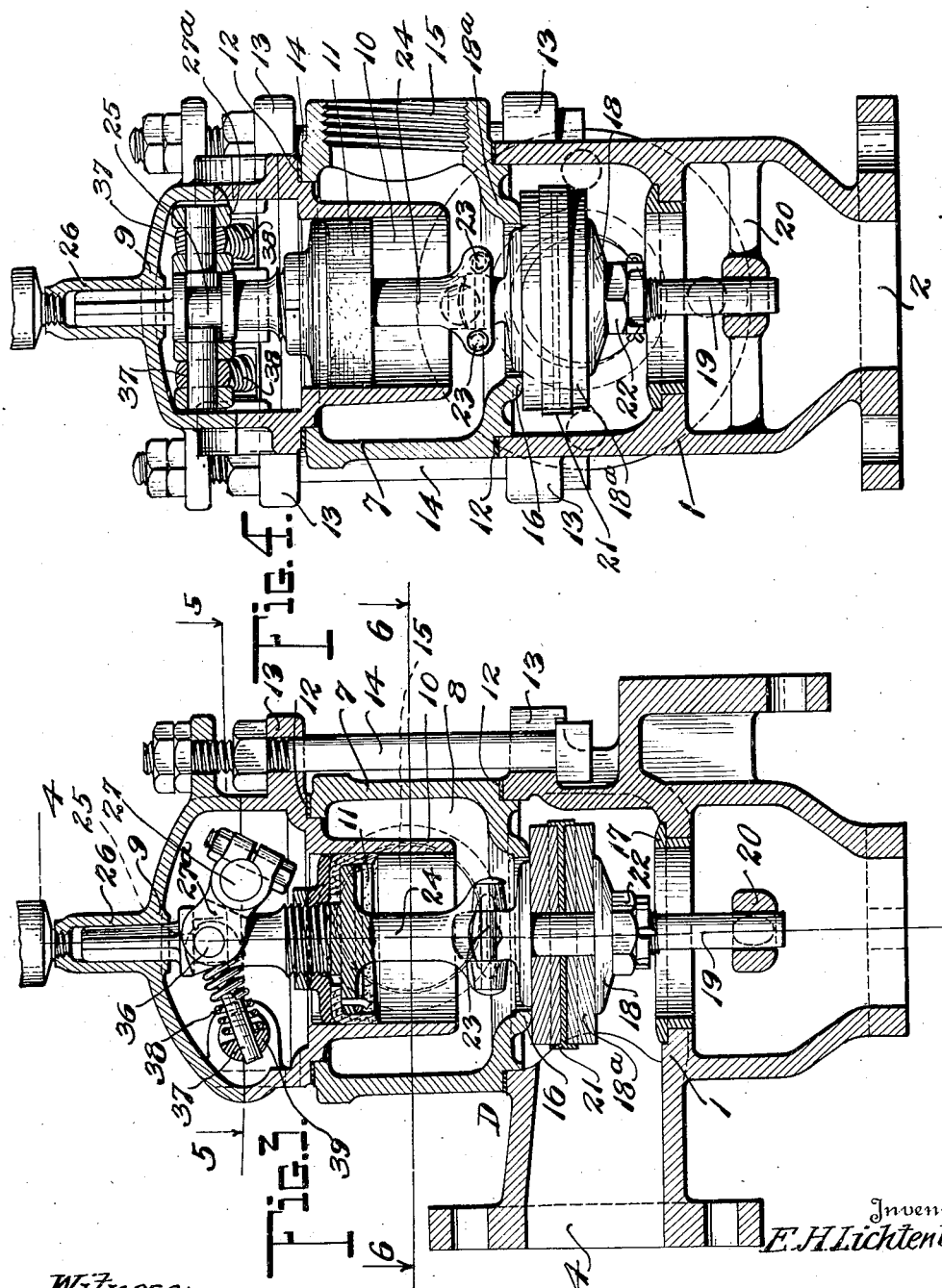

1,525,100

UNITED STATES PATENT OFFICE.

ERICH H. LICHTENBERG, OF MILWAUKEE, WISCONSIN, ASSIGNOR TO KOEHRING COMPANY, OF MILWAUKEE, WISCONSON, A CORPORATION.

CONCRETE-MIXER THREE-WAY-VALVE MECHANISM.

Application filed May 1, 1922. Serial No. 557,573.

*To all whom it may concern:*

Be it known that I, ERICH H. LICHTENBERG, a citizen of the United States, residing at Milwaukee, in the county of Milwaukee and State of Wisconsin, have invented certain new and useful Improvements in Concrete-Mixer Three-Way-Valve Mechanism, of which the following is a specification.

This invention deals with the problem of improving upon the present type of what is known as the "three-way valve" employed as a part of the equipment of concrete mixers of many different types found in practically universal use today.

A full comprehension of the invention may be gained by an explanation of the difficulties experienced in the use of the three-way valve constructions now employed in machines of the class above referred to.

In the first place it is known to those versed in the art that concrete mixers are ordinarily equipped with water tanks for the temporary storage of water, from which tanks a predetermined quantity of water, dependent upon the size of the batch of concrete to be mixed in the mixing machine, is caused to flow into the mixing drum with the concrete aggregates. It is the custom to supply the water to the water tank from a water main or other source of water supply, for which purpose there leads to the water tank what is known as a pipe line. To cause flowing of the water from the water tank to the mixer a suitable water pipe leads to the mixing drum of the machine. The three-way valve to which I have referred is a valve that controls the flow of water from the main or pipe line to the water tank for supplying the latter, and having the additional function of controlling the flow of the water from the tank to the mixer, at which time the valve cuts off the flow from the pipe line to the tank. Those conversant with the operation of concrete mixers are advised of the disadvantages of the common form of three-way plug valve employed for the purposes just described. It is known that the pressure of the water passing through the pipe line varies quite commonly from twenty-five to two hundred and fifty pounds. Many times a mixer with the water controlling equipment of the class discussed herein is located a considerable distance from the source of water supply; often the pipe line conducting the water to the mixer is miles in length, as when the mixing equipment is being employed in out of town road construction.

The common method of operating the three-way valve is to connect the pipe line to supply water to the water tank, at proper intervals, and each time a batch of concrete aggregates is fed to the concrete mixing drum the three-way valve is operated to permit flowing of the water from the tank into the mixing drum. This operation is performed manually in the usual types of machines employed today. When it is borne in mind that a concrete mixer operating at high efficiency is required to handle batches on the basis of "a minute mix" per batch, it is evident that the operator of the machine is required to open and close the three-way valve once for each batch of materials handled in the mixing machine. An unusual amount of labor is involved in the operation of three-way valves in the above manner, on account of the fact that the valve has to be moved under the varying pressures of the head of water flowing through the pipe line. But even more serious difficulty is experienced. Obviously a concrete mixing machine is always handling aggregates comprising sand, gravel, and similar materials, in addition to which foreign matter, rust of incrustation in the pipe line and foreign substances carried with the water flowing therethrough must pass the three-way valve. Such foreign substances naturally interfere with maintaining the valve at normal operating efficiency, causing quick wearing out of the same and its replacement. The plug and ordinary types of three-way valves is one which can rarely be repaired, having to be ground true in order to seat properly, and replacements are often difficult to make when machines are working at high efficiency and where they are located remote from the source of supply of repair parts including such valves. Additionally the said three-way valve has serious disadvantages owing to the difficulty of its operation under varying heads of pressure of the water in the pipe line, as before stated. From my experience I have concluded that the metal to metal contact of the ordinary types of three-way valves of concrete mixers prohibits the efficient employment of such valves for the reasons which I have pointed out above.

The essential objects of my present invention, therefore, have been to produce an entirely new type of three-way valve for the purposes outlined hereinbefore, obviating the disadvantages presented by eliminating all liklihood of possible difficulties of operation, owing to the fact that the valve is handling water under variable pressure conditions, and the other difficulties arising from the inability of the three-way plug valve to stand up under the heavy wear and tear involved in the use of concrete mixer equipment.

Having in view the foregoing unusual and trying conditions of service of a concrete mixer three-way valve, I have designed an entirely new type of valve in which I avoid the possibility of inefficiency in its operation under varying pressure conditions of the water flow through the pipe line, by utilizing the principle of counter-balancing all pressure of the water upon the valve, as respects the positions assumed by the valve when adjusted for the proper controls of the water flow as required. The counter-balancing effect is maintained in respect to the valve, furthermore, when in movement, and on account of the phases of operation which are set forth, I have obtained a valve which is very easy to operate, and therefore avoids the disadvantages of the ordinary three-way valve so far as either manual or power actuation of the valve may be concerned. In addition I have so designed my valve as to eliminate metal to metal contact of parts of the valve and its seats, with the resultant disadvantages that have been fully elucidated in the objects of my invention. Again the design of my valve construction to be claimed hereinafter deals fully with the requirements of accessibility of the valve for purposes of repair, in that it makes for ease of repair respecting particularly the renewal of gaskets which coact with certain valve seats. The construction is such that the operator or engineer of the machine may himself readily open up the valve mechanism and quickly replace worn parts, which ordinarily would only be the gaskets above mentioned and possibly the packing of a counter-balancing piston which is connected with the valve proper. The consideration of quick repair advantages is one of great importance in this particular art, since the improper working of the three-way valve will impair the efficient operation of an enormous mixing plant, owing to the extremely large capacity of concrete mixers and associated equipment as now employed in building construction and road paving operations.

I utilize also in conjunction with my valve, certain special manual, mechanical or automatic devices for actuating the valve to control the water flow to the tank or to the mixing drum, as the case may be, and I wish it to be understood that in addition to the broad characteristics of novelty of my invention, pointed out above, my valve mechanism includes detailed phases of construction of operating parts and valve and piston casing features which are of especial value in the practical art and possessed of specific novelty.

In the accompanying drawings—

Figure 1 is a view in elevation, showing a portion of a concrete mixing machine including primarily the drum, loading skip, water tank and three-way valve features, the valve illustrated embodying my invention.

Figure 2 is an end view of certain of the parts which are illustrated in Figure 1, the mixing drum omitted, as well as the loading skip.

Figure 3 is a vertical sectional view through the casing of my valve and counterbalancing piston mechanism.

Figure 4 is a view similar to Figure 3, but being a section taken at right angles thereto about on the line 4—4 of Figure 3.

Figure 5 is a horizontal sectional view taken approximately upon the line 5—5 of Figure 3.

Figure 6 is another horizontal sectional view made about on the line 6—6 of Figure 3.

In the drawings and in the following description, similar reference characters refer to similar parts.

Describing the invention primarily with reference to the drawings, A denotes a conventional form of mixing drum of a conventional type of mixing machine; B correspondingly denotes a conventional loading skip, illustrated only in part; C is the cable wheel having a cable leading to the loading skip, but not illustrated, for elevating said skip to substantially the position in which it is shown in Figure 1, at which position it is discharging into the drum. At D is generally shown my three-way valve mechanism and at E I have shown a water tank for the well known purposes thereof.

My automatic counter-balancing three-way valve will be best understood on reference to Figures 3 to 6 inclusive. The valve mechanism comprises a casing 1, having the bottom out-flow opening 2 for connection with a pipe 3 that leads into the drum A of the mixing machine. The casing 1 has a port 4 for connection with the water tank in-flow and out-flow pipe 5, which is suitably connected with the bottom portion of the water tank E which is the usual closed storage tank or reservoir adapted to retain pressure when filled. Approximately at the point of connection of the pipe 5 with the water tank E, there is located a regulating valve, the construction of which is well known to those versed in the art and is exemplified in United States Patent #1,149,922, issued August 10, 1915 to Koehring. The regulating valve operating device is designated 6 and is not shown in detail because of the foregoing exemplification. Said valve is adjustable to determine the particular quantity of water which will flow from the water tank to the mixing drum, upon the opening of my three-way valve, the description of the construction of which will now be continued.

The casing 1 of my valve mechanism has a middle chamber 7, providing a water chamber 8 just above the middle of the casing, viewed as a whole. On top of the middle section 7 of the casing 1 is seated the head or top section 9, which is formed with an open ended cylinder 10 constituting a piston chamber for the counter-balancing piston 11. The connections between the sections 7 and 9, and the body of the casing 1 are water tight, through the provision of interposed gaskets 12, and there are formed upon the sides of the casing 1 and the head section 9 outstanding notched lugs 13, with which are engaged the connecting or binding rods 14, by which the sections of the casing are attached firmly together, but readily separable for facilitating access to the interior thereof.

The middle section 7 of the casing 1 has an in-flow port 15, with which the pipe line leading to the source of water supply is connected, so that the chamber 8 is practically an in-flow chamber for obvious reasons. At its lower end the section 7 of the casing 1 is formed with a valve seat 16, consisting of an annular flange projecting inwardly from the walls of the section. Opposed to seat 16, spaced therefrom, and formed in the portion of the casing 1 just above the out-flow opening 2, is a corresponding valve seat 17. Interposed between the seats 16 and 17 is my three-way valve 18 preferably made up of a stem 19, guided at its lower end by a guide bar 20 and carrying a central metal disc 21 and two rubber or composition discs 18ª on opposite sides of said metal discs or web. At its lower portion the stem 19 carries a removable nut 22 to enable detachment of the parts 21 and 18ª for replacement or readjustment of the parts 18ª should they become worn and require such attention. The discs 18ª provide upper and lower faces for the valve 18 adapted to seat upon the sides 16 and 17 alternately, according to the actuation of the valve when moved up or down. At its upper end the stem 19 of my valve 18 is universally connected at 23 with the lower rod 24 of the piston 11. The piston 11 has the upper screw threaded operating rod 25, the upper end of which slides in a guided manner in a tubular guide extension 26 on the upper portion of the head section 9 of the casing 1.

The piston 11 and the valve 18 are, of course, so connected that they must be moved together, and the pivotal connection at 23 is designed to avoid rigidity in the connections between these parts, such as might interfere with the easy and proper seating of the valve 18 in respect to either of the seats 16 and 17.

I utilize special actuating means for the parts 11 and 18, shown best in Figures 3 to 5 inclusive, and Figure 1. Referring to Figures 1 and 3, it will be observed that I mount in suitable bearings in the side walls of the section 9 of my casing 1, a shaft 27. The shaft 27 extends at one end from the part 9, and carries an operating arm 28. The arm 28 is a rocker arm to rock the shaft 27, and may be moved manually by the hand lever 29, which is connected to the arm 28 by a rod 30. Movement of the hand lever 29 in opposite directions will open and close the valve 18 incident to a reciprocating movement of the parts 18 and 11. An automatic opening of the valve 18 to permit the flow of water from the tank E to the mixer A will be caused by operation of a trip rod 31, shown in Figure 1 connected at one end to the arm 28, and extending at its other end through a guide member 32, so as to project into the path of an abutment 33 on the skip B. The abutment 33 is a pivoted member adapted to engage the trip rod 31 as the skip approaches and reaches its uppermost position for discharging its contents into the drum A. The operation of the valve 18 by the means 31 and 33, therefore, will take place simultaneously with the charging of the mixing drum by the skip, and a spring 34 normally maintains the abutment 33 in proper position to engage the rod 31 at the time when the movement of the rod 31 should commence, the said member 33 rocking slightly as it pushes on the rod 31 until the outer side of the member 33 engages a fixed stop 35 on the side of the skip B, adjacent to where the abutment 33 is pivoted to said skip. This feature of construction just described is one which, of course, may be modified considerably to meet the requirements of operation as stated, and I do not wish to be limited thereto.

Reverting to Figure 3 it is notable that the shaft 27 has arms 27ª connected with a pivot member 36 on the upper rod 25 of the piston 11, whereby the movement of the shaft 27 is communicated to the rod 25 and the piston 11 and valve 18. Likewise it will be noted that a yieldable contrivance is associated with the rod 25 opposite the arms 27ª, and comprises a pair of rods 37 surrounded by coiled springs 38 interposed between a cross and guide bar 39 mounted on suitable bearings in the member 9. The rods 37 are coupled to the pivot 36 at one end and adapted to slide through the guide member 39 at their other ends. The purpose of the yielding device just mentioned, is to provide a means for yieldably holding the valve 18 seated either against the seat 16 or against the seat 17 of the casing 1. The parts 37 and 27ª may be said to constitute a toggle arrangement or lever device for actuating the piston 11 and valve 18.

It will be apparent that the water from the pipe line and water supply enters the casing 1 at the in-flow opening 15, passes to the in-flow chamber 8 and acts with substantially counter-balancing pressure upon the lower surface of piston 11 and the upper surface of the valve 18. Under these conditions any variation in the pressure of the water so disadvantageous in the operation of the present types of three-way valves becomes ineffective to in any way affect the easy operation of my present type of valve. If the valve be positioned, as shown in Figures 3 and 4, the water will be flowing from the tank E through the pipe 5, port 4 and out-flow opening 2, into pipe 3 and into the mixing drum. This is the position in which the valve may be said to be opened for supplying water to the mixing drum at the time of charging of the mixer with the concrete aggregates. Movement of the valve, as by shifting of the hand lever 29 to the dotted line position of Figure 1, will cause said valve to seat upon the seat 17, cut off the flow of water from the tank E to the drum A, and permit the flow of water from the in-flow chamber 8, through the port 4 and pipe 5 into the tank E to fill said tank to a proper height, or replenish the supply of water therein, according to the particular working condition.

It will be apparent also that my valve construction is self-draining, in that the positioning of the valve 18, as per Figures 3 and 4, and the proper adjustment of the regulating valve means 6, will enable all water to be drained out of the tank E and the pipes 5 and valve casing 1. The simple removal of the binding or connecting rods 14, attaching the sections of the casing 1 together, permits the operator to have ready access to the interior parts of the casing which constitute my valve mechanism, and the packing of the piston 11 may be readily replaced, or the valve discs 18ª turned over, replaced or repaired with great ease and very quickly, the latter being of special importance.

It is notable that different types of concrete mixing machines, and conditions under which the machines are operated, make desirable some ready means for connecting the intake pipe line to the casing when coming from different directions. The foregoing is accommodated for on account of the fact that the middle section 7 of my valve casing may be turned to any desired position to bring the opening 15 to the proper point at which it is desired to connect the pipe line 40 which leads to the source of water supply, see Fig. 2.

I am not aware of the use for the purposes of my invention of any type of counter-balancing three-way concrete mixer valve, no such valve having come to my notice in my many years of experience in concrete machine engineering. I, therefore, consider my valve construction broadly new in the art of concrete mixers, and desire that my claims be interpreted accordingly in the light hereof.

There is shown in a general way in Fig. 1 a batchmeter H of any well known type comprising an indicator 42 and a discharge chute lock 43 adapted to engage a locking part 44 on the discharge chute shaft 45, with a setting arm 46 to start the batchmeter into action. This batchmeter times the proper mixing period, operates the indicator, and unlocks the discharge at the proper moment. The lever 29 has an arm 29ª connected with the arm 46 by a loose or bolt and slot connection at 46ª.

The condition arises at times when a slight quantity of water must be added to the regular measured quantity usually supplied to the aggregates in the drum by the customary operation of the three way valve. The degree of moisture in the sand or aggregates is one controlling factor in the above connection.

As it is important that the mixing period be controlled positively to begin only after all water and aggregates are in the mixing drum, I connect the valve operating lever 29 with the setting lever 46 so that if the operator does move the former to add even the slightest amount of water, subsequent to the automatic operation thereof, on charging, the batchmeter will be reset and its period of control will begin as of the time when the last quantity of water is put into the mixing drum. This is a highly important control phase of my invention and is broadly new so far as I am aware. While I show one form of means herein, my preferred form is made the subject matter of a separate application for patent. Of course, every time the skip B operates the three way water valve the batchmeter is actuated to start its operation through the provision of the parts 29ª and 46. A simple type of batchmeter is shown in Lichtenberg Patent 1,321,460 issued Nov. 11, 1919.

It will be self evident that the springs 38 not only yieldably hold the valve 18 against either of the seats 16 and 17, but said springs act to cause a quick movement of the valve to its position against either seat, when actuated. The foregoing action is due to the fact that the parts 38, 36 and 27ª, virtually form a toggle lever, the joint of which is normally broken, and the spring elements of which tend to quickly carry the opposing parts of the toggle across the dead center space to either one of the break joint positions.

I have hereinbefore characterized the action of the water on the parts 11 and 18, as substantially counterbalancing. This terminology is used advisedly because it is evident upon reference to the drawings that the area of the piston 11, see Fig. 3, is greater than the diameter of the opening at the valve seat 16. This makes it clear that fluid pressure from the inflow opening 15 acts to maintain the valve 18 in the closed position of Fig. 3. Likewise, supposing the valve 18 to be closed on the seat 17, it is evident that the fluid pressure from the inflow 15 acts to hold the valve on the seat 17, owing to the differential between the areas of the valve 18 and the piston 11. The former is slightly larger and its whole upper surface is exposed to the action of the fluid pressure when the valve is in its lower closed position. Thus while the water pressure substantially counterbalances in its action on the parts 11 and 18, adjustments of the valve offer coactions wherein the water pressure serves to hold the valve on either of its coacting seats, the general counterbalancing being quite sufficient to render the valve easily operable.

Having thus described my invention what I claim as new and desire to secure by Letters Patent is,

1. In combination, a water supply means adapted to lead to a mixing drum, valve mechanism controlling said water supply means and including a valve for controlling the flow of water into the mixing drum, oppositely acting means cooperative with said valve tending to counterbalance the pressure of the water controlled by the valve in relation to the latter, operating means for the valve, a water storage and supply tank connected with said water supply means and having said connection controlled by said valve, the valve means being so arranged in one position that water flows from the supply means to the tank, and in another position the water flows from the tank to the mixing drum, the counter-balancing means aforesaid acting upon the valve when it is positioned to supply the water to the tank or to the concrete mixing drum.

2. In combination with a water supply pipe line, a water storage tank therefor, and a three-way valve controlling the passage of water from the pipe line to the tank, and from the tank to a mixer, together with oppositely acting counter-balancing means for substantially counter-balancing the pressure of the water, the passage of which is controlled by said valve, connected to and co-operating with the valve in both of the controlling functions of the latter.

3. In combination with a water supply pipe line, a water storage tank therefor, and a three-way valve controlling the passage of water from the pipe line to the tank, and from the tank to a mixer, together with counter-balancing means for counter-balancing the pressure of the water, the passage of which is controlled by said valve, connected to the valve, said counter-balancing means including a piston attached to the valve and means co-acting with the piston to hold the piston and the valve in different operated positions.

4. A three-way valve mechanism for concrete mixers, comprising a casing having opposing valve seats therein, a valve operating between said seats, pressure counter-balancing means in said casing, including a piston movably connected with the valve, and an actuating part for the valve and piston.

5. A three-way valve mechanism for concrete mixers, comprising a casing having opposing valve seats therein, a valve to co-operate with said seat, pressure counter-balancing means in said casing, including a piston movably connected with the valve, an actuating part for the valve and piston, and guide means extending from one side of the valve opposite the point of connection of the valve with the piston.

6. A three-way valve mechanism for concrete mixers, comprising a casing having opposing valve seats therein, a valve to co-operate with said seat, pressure counter-balancing means in said casing, including a piston movably connected with the valve, an actuating part for the valve and piston, guide means extending from one side of the valve opposite the point of connection of the valve with the piston, guide means for the piston extending therefrom opposite the point of movable connection between the piston and the valve and having connection with the actuating part aforesaid.

7. A three-way valve mechanism for concrete mixers, comprising a casing having opposing valve seats therein, a valve to co-act with said seats, pressure counter-balancing means in said casing, including a piston movably connected with the valve, an actuating part for the valve and piston, guide means extending from one side of the valve opposite the point of connection of the valve with the piston, guide means for the piston extending therefrom, opposite the point of movable connection between the piston and the valve and having connection with the actuating part aforesaid, and a yieldable device cooperating with the valve and piston to yieldably hold the valve seated upon either one of the seats provided therefor.

8. A three-way concrete mixer valve mechanism comprising a casing equipped with opposing valve seats, a valve operating between said seats, a pressure counter-balancing piston connected with said valve, actuating means for the valve, and yielding means for yieldably holding said valve in engagement with either one of the seats aforesaid.

9. A three-way concrete mixer valve mechanism comprising a casing equipped with opposing valve seats, a valve operating between said seats, a pressure counter-balancing piston connected with said valve, actuating means for the valve, and yielding means for yieldably holding said valve in engagement with either one of the seats aforesaid combined with a casing for the valve enclosing the valve and piston parts above mentioned.

10. A three-way concrete mixer valve mechanism comprising a casing equipped with opposing valve seats, a valve operating between said seats, a pressure counter-balancing piston connected with said valve, actuating means for the valve, and yielding means for yieldably holding said valve in engagement with either one of the seats aforesaid combined with a casing for the valve enclosing the valve and piston parts above mentioned, said casing comprising a section adapted to be turned in relation to the body of the casing and having a pipe line connecting opening.

11. A three-way valve for concrete mixers, comprising a casing equipped with opposed valve seats, a valve operating between said seats, a pressure counter-balancing piston flexibly connected to the valve, the casing comprising sections, one of which is equipped with the valve seats, another of which is equipped with a pipe line connecting opening, and another of which has a cylinder for said counter-balancing piston, the second mentioned section being adapted to be turned to bring the pipe line connecting opening into different positions for connection with the pipe line.

12. A three-way valve for concrete mixers, comprising a casing equipped with opposed valve seats, a valve operating between said seats, a pressure counter-balancing piston flexibly connected to the valve, the casing comprising sections, one of which is equipped with the valve seats, another of which is equipped with a pipe line connecting opening, and another of which has a cylinder for said counter-balancing piston, the several sections being detachable from one another for access to the piston and valve parts.

13. A three-way valve for concrete mixers, comprising a casing equipped with opposed valve seats, a valve operating between said seats, a pressure counter-balancing piston flexibly connected to the valve, the casing comprising sections, one of which is equipped with a valve seat, another of which is equipped with a pipe line connecting opening, and another of which has a cylinder for said counter-balancing piston, the second mentioned section being adapted to be turned to bring the pipe line connecting opening into different positions in connection with the pipe line, the last mentioned section having a guiding extension, a rod on the piston cooperative with said guiding extension and housed in said last mentioned section, an actuating shaft mounted in said last mentioned section, and a yielding device also housed in said last mentioned section, and adapted to yieldably hold the valve upon either one of its seats, combined with detachable fastening members for maintaining the sections of the casing assembled one upon the other.

14. In valve means of the class set forth, a valve casing provided with a water supply passage leading thereinto, and equipped with a valve chamber having two spaced opposite valve seats, also having a counterbalancing chamber, the water supply opening communicating with the counterbalancing chamber and the valve chamber, a valve mounted in the valve chamber between said seats and having oppositely disposed valve faces to seat face on against the adjacent valve seats aforesaid, combined with a counterbalancing element connected with the valve and operating in the counterbalancing chamber so that the water entering the two said chambers acts on the counterbalancing element and said valve with substantially equal pressure effects, and an operating means for moving the valve.

15. In valve means of the class set forth, a valve casing provided with a water supply passage leading thereinto, and equipped with a valve chamber having two spaced opposite valve seats, also having a counterbalancing chamber, the water supply opening communicating with the counterbalancing chamber and the valve chamber, a valve mounted in the valve chamber between said seats and having oppositely disposed valve faces to seat face on against the adjacent valve seats aforesaid, the casing having an inflow and outflow port leading therefrom at the valve chamber and communicating in one position of the valve with the supply passage of the casing, and said casing also having a separate outflow opening in the same, and adapted to communicate with said inflow and outflow port when the valve is in a second position.

16. In valve means of the class set forth, a valve casing provided with a water supply passage leading thereinto, and equipped with a valve chamber having two spaced opposite valve seats, also having a counterbalancing chamber, the water supply opening communicating with the counterbalancing chamber and with the valve chamber, a valve mounted in the valve chamber between the two seats above mentioned and comprising a member provided with valve disks on its upper and lower sides each adapted to seat face on against the one of the said valve seats adjacent to which it is disposed, upon movement of the valve back and forth between said seats, and a counterbalancing element mounted in the counterbalancing chamber and connected with the valve aforesaid, the valve and the counterbalancing element being arranged to receive substantially equal pressure forces of the water entering the valve casing through the supply passage previously mentioned.

17. In valve means of the class set forth, a valve casing provided with a water supply passage leading thereinto, and equipped with a valve chamber having two spaced opposite valve seats, also having a counterbalancing chamber, the water supply opening communicating with the counterbalancing chamber and with the valve chamber, a valve mounted in the valve chamber between the two seats above mentioned and comprising a member provided with valve disks on its upper and lower sides each adapted to seat face on against the one of the said valve seats adjacent to which it is disposed, upon movement of the valve back and forth between said seats, and a counterbalancing element mounted in the counterbalancing chamber and connected with the valve aforesaid, the valve and the counterbalancing element being arranged to receive substantially equal pressure forces of the water entering the valve casing through the supply passage previously mentioned, and guiding members extending from the valve at opposite sides thereof and cooperating with the casing to maintain the valve in proper relation to its seats, one of said guiding members forming the connecting means between the counterbalancing element and the valve.

18. In valve means of the class set forth, a valve casing provided with a water supply passage leading thereinto, and equipped with a valve chamber having two spaced opposite valve seats, also having a counterbalancing chamber, the water supply opening communicating with the counterbalancing chamber and the valve chamber, a valve mounted in the valve chamber between said seats and having oppositely disposed valve faces to seat face on against the adjacent valve seats aforesaid, combined with a counterbalancing element connected with the valve and operating in the counterbalancing chamber so that the water entering the two said chambers acts on the counterbalancing element and said valve with substantially equal pressure effects, and an operating means for moving the valve, the valve casing comprising a removable part through which the valve is displaceable, and the valve faces comprising removable disks adapted to be readily removed when the valve has been displaced in the manner above mentioned.

19. In valve means of the class set forth, a valve casing provided with a water supply passage leading thereinto, and equipped with a valve chamber intermediate of its ends and a counterbalancing piston chamber adjacent to one of its ends, the chamber and piston chamber being in communication with the water supply passage, a counterbalancing piston in the piston chamber, said intermediate portion of the valve casing having two opposing valve seats, one adjacent to and the other remote from the piston and the valve in the valve chamber being equipped with oppositely disposed valve faces for cooperation with said valve seats, said valve being of larger diameter than the piston and mounted to move back and forth between the valve seats, means connecting the said counterbalancing piston with the valve, and means for operating the valve to cause it to coact with either of the seats aforesaid, the valve seat adjacent to the piston controlling an opening of a diameter smaller than that of the piston.

20. In valve means of the class set forth, a valve casing provided with a water supply passage leading thereinto, and equipped with a valve chamber provided with two opposing spaced valve seats, a valve located in said valve chamber and adapted to seat upon either of said valve seats as controlled by a movement of the valve back and forth between the seats, an outflow and inflow port communicating with the valve chamber and adapted to communicate with the water supply passage when the valve is seated against one of its said seats, and a second outflow passage arranged to communicate with said outflow and inflow port when the said valve is seated upon the other of its said seats, and a counterbalancing piston connected with the valve, the said piston and valve being arranged so that the water entering the supply passage and passing into the casing will act upon the said piston and the valve with substantially equal pressure forces, together with operating means for the valve and said piston, there being sufficient differential between said pressure forces that the fluid pressure may act on the piston or the valve to hold the latter on either of its seats.

21. In valve means of the class set forth, a valve casing provided with a water supply passage leading thereinto, and equipped with a valve chamber provided with two opposing spaced valve seats, a valve located in said valve chamber and adapted to seat upon either of said valve seats as controlled by a movement of the valve back and forth between the seats, an outflow and inflow port communicating with the valve chamber and adapted to communicate with the water supply passage when the valve is seated against one of its said seats, and a second outflow passage arranged to communicate with said outflow and inflow port when the said valve is seated upon the other of its said seats and a counterbalancing piston connected with the valve, the said piston and valve being arranged so that the water entering the supply passage and passing into the casing will act upon the said piston and the valve with substantially equal pressure forces, together with operating means for the valve and said piston, the said valve comprising a body having removable valve disks at opposite sides thereof, and the casing comprising a removable portion through which the valve may be displaced to enable the said valve disks to be renewed as required to maintain their efficiency.

22. In a valve construction, a valve body, a main valve chamber, inlet and discharge openings in the wall of said chamber, a valve closure member adapted to selectively close either of said openings, and means associated with said valve whereby fluid pressure from said inlet opening serves to maintain the valve closure in either of its closed positions.

23. In a valve construction, a valve body, a main valve chamber, inlet and discharge openings in the wall of said chamber, a valve rod extending through both said openings, a valve disc carried by said rod and adapted to selectively close either of said openings and means connected to said valve rod whereby fluid pressure from said inlet opening serves to maintain the valve disc in either of its closed positions.

24. In a valve construction, a valve body, a main valve chamber, inlet and discharge openings in the wall of said chamber, a valve rod extending through both said openings, a valve disc carried by said rod and adapted to selectively close either of said openings and a pressure disc connected to said valve rod whereby fluid pressure from said inlet opening acting against said pressure disc serves to maintain the valve disc in either of its closed positions.

25. In a valve construction, a valve body, a main valve chamber, a discharge opening in the wall of said chamber, an inlet chamber adjacent the main chamber, an opening through the wall between the main and inlet chambers, a valve closure member adapted to selectively close either of said openings, and means associated with said valve whereby fluid pressure from said inlet opening serves to maintain the valve closure in either of its closed positions.

26. In a valve construction, a valve body, a main valve chamber, a discharge opening in the wall of said chamber, an inlet chamber adjacent the main chamber, an opening through the wall between the main and inlet chambers, a valve rod extending into the main and inlet chambers, a valve disc carried by the rod in the main chamber and adapted to selectively close either of said openings, and a pressure disc carried by the rod in the inlet chamber, the discs and openings being so proportioned that fluid pressure against the pressure disc and valve disc serves to maintain the valve in either of its closed positions.

27. In a valve construction, a valve body, a main valve chamber, a discharge opening in the wall of said chamber, an inlet chamber adjacent the main chamber, an opening through the wall between the main and inlet chambers, a valve rod extending into the main and inlet chambers, a valve disc carried by the rod in the main chamber and adapted to selectively close either of said openings, an open ended cylinder communicating with the inlet chamber, and a piston fitting in said cylinder, and carried by said rod, the disc, piston and openings being so proportioned that fluid pressure against the piston and valve disc serves to maintain the valve in either of its closed positions.

28. In a valve construction, a valve body, a main valve chamber, inlet and discharge openings in the wall of said chamber, a valve rod extending through these openings, a valve member fitted on said rod, packing rings upon opposite sides of said chamber, means to removably retain the rings in engagement with said member, the packing rings being adapted to be selectively moved into engagement with the walls adjacent said inlet and discharge openings, and means associated with said valve assembly whereby fluid pressure from said inlet opening serves to maintain either ring against its seat.

29. In a valve construction, a valve body, a valve chamber, openings in opposed walls of said chamber, a valve rod extending through said chamber and openings, an abutment on said rod, a valve member fitted on said rod, a packing ring retained between said abutment and valve member, a collar fitted on said rod, a second packing ring retained between said collar and valve member, and removable means adapted to retain said members in position on the valve rod.

30. In a valve construction, a valve body, a main valve chamber, inlet and discharge openings in the wall of said chamber, a valve closure member adapted to selectively close either of said openings, means associated with said valve whereby fluid pressure from said inlet opening serves to maintain the valve closure in either of its closed positions, comprising a counterbalancing piston acting on the valve under the influence of fluid pressure to hold the valve in one of its closed positions, the valve being so formed that in the other of its closed positions the piston effect above mentioned is not obtained, and the fluid pressure maintains the valve in the said other closed position.

31. In a valve construction, a valve body, a main valve chamber having an inlet opening, an outflow opening, and a combined inlet and outflow opening, a valve adapted to selectively control communication of the inlet opening with the said inlet and outflow opening, and communication of the inlet and outflow opening with the outflow opening, and means coacting with the valve whereby fluid pressure from the inlet acts to hold the valve in either of its positions controlling the communications above mentioned.

32. In a three-way valve mechanism for concrete mixers, a casing having opposing valve seats therein, a valve operating between said seats, a piston device connected with said valve and so arranged as to receive pressure counter-balancing pressure that may act upon the valve, moving means for the valve to control its cooperation with said seats, and additional means coacting with the valve and including spring mechanism for causing a quick movement of the valve to either one of its seats after movement has been initiated by the above first mentioned moving means.

In testimony whereof I affix my signature.

ERICH H. LICHTENBERG.